Aug. 5, 1958
M. VLTAVSKY
2,846,562
HYDRAULIC DEVICE FOR THE DRIVE OF RESISTANCE
SEAM-WELDING MACHINES
Filed March 30, 1956
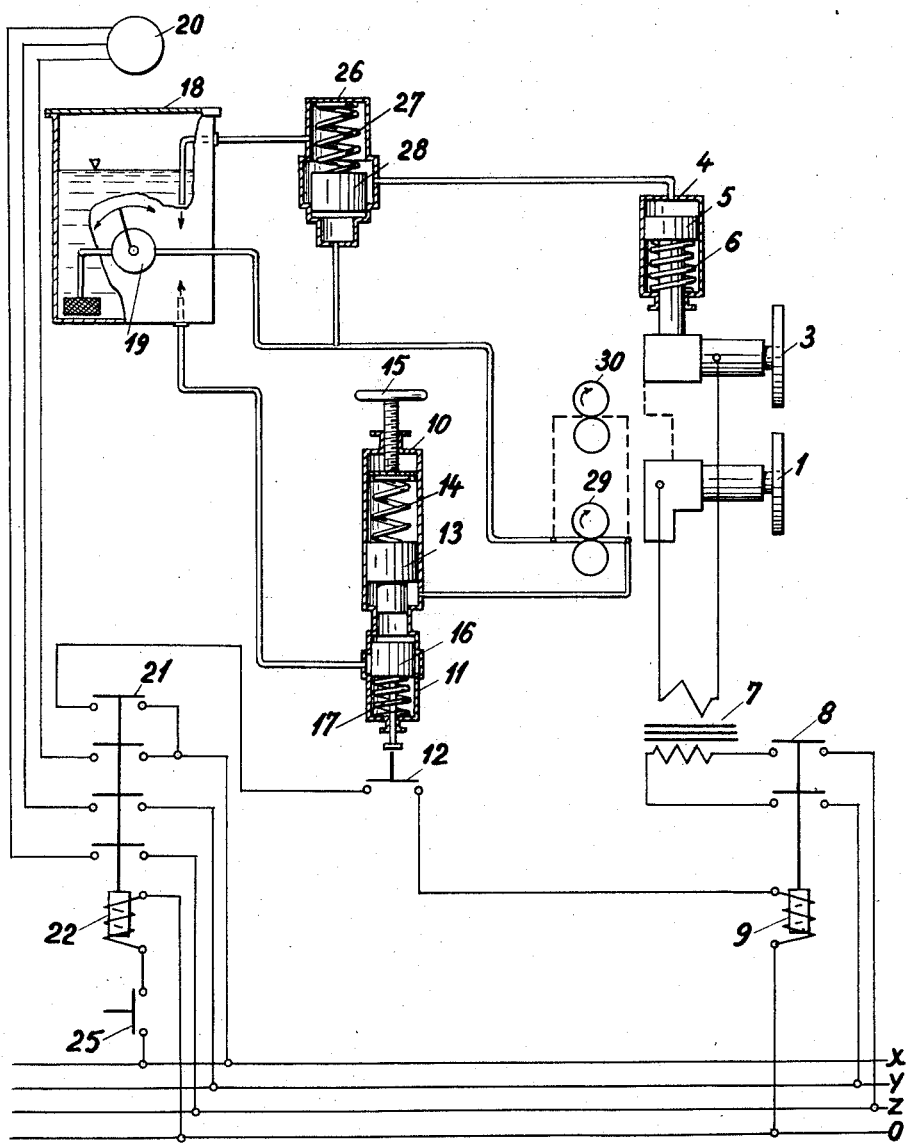
INVENTOR.
Milan Vltavský
BY

United States Patent Office 2,846,562
Patented Aug. 5, 1958

2,846,562

HYDRAULIC DEVICE FOR THE DRIVE OF RESISTANCE SEAM-WELDING MACHINES

Milan Vltavsky, Bratislava, Czechoslovakia

Application March 30, 1956, Serial No. 575,096

Claims priority, application Czechoslovakia April 5, 1955

3 Claims. (Cl. 219—81)

In resistance seam-welding machine operations it is necessary to press the welding rollers against the object to be welded before starting the welding operation and to switch on the welding current only after attaining the requisite pressure while simultaneously turning the rollers. Consequently, the welding rollers are subjected to heavy wear, which results in a reduction of their diameter. In order to maintain the welding speed undiminished, it is then necessary to increase the rotational speed of the rollers reduced in diameter. For welding materials of different thickness or different kinds of materials it is necessary to change the welding speed, i. e. to use welding rollers of different diameters.

In the hitherto known designs of resistance seam-welding machines the drive is generally arranged in such a way that the pressing of the welding rollers against the object to be welded is brought about by a pneumatic cylinder controlled by electrically operated valves, the pressure being controlled through a particular check valve. Moreover, a pneumatic pressure contact is connected to the pressure space of the pneumatic cylinder, said contact, when closed, causing operation of the electric motor driving the welding rollers and at the same time switching on the welding current. A drawback of this arrangement consists on the one hand in its intricacy and on the other hand in that at any change of pressure brought about by the check valve it is necessary to adjust to the same pressure the operation of said pressure contact. Any negligence in this procedure could result in the welding current being switched on too early, that is, before the introduction of the full holding down pressure between the rollers, so that sparking occurs resulting in a consumption of the roller surface or even in burning of the object being welded. The aforesaid pneumatic pressure contacts are a frequent cause of breakdowns in view of their functional unreliability. Moreover, such welding machines are dependent on a separate pressure source which fact in itself is an essential drawback. The change of welding speeds is carried out, as a rule, by the exchange of gears which is a time-wasting operation.

The object of the present invention is to provide a device for the drive of resistance seam-welding machines whereby all the aforesaid drawbacks of the hitherto known devices of this kind are removed. In the device according to the present invention a hydraulic drive is used which especially in this case improves the function of the resistance seam-welding machines.

In accordance with an aspect of this invention, rotational movement of the welding rollers is brought about by means of a hydraulic motor or of a number of hydraulic motors corresponding to the number of welding rollers to be driven. One or more hydraulic motors are driven by the same pressure source which supplies fluid under pressure to the pressing piston and are connected into the delivery pipeline between the pressure source and a hydraulic control device which controls the pressing down force and the movement of the pressing piston and the switching on of the welding circuit and rotation of the welding rollers. As a pressure source, for example, a hydraulic pump can be used. The pressure source is designed in a well known manner so as to supply the pressure fluid in a quantity which can be changed stepwise or continuously, whereby a continuously or stepwise changing welding speed is attained which can be adjusted even during the welding process. A change of the welding speed is often required in practice, for example, for passing from a tight weld to an interrupted weld. In the hitherto known machines, the change of the welding speed in a continuous way was impracticable. In the case of a plurality of hydraulic motors it is possible to link the same up in parallel, so that the parallel connected motors constitute a hydraulic differential. Through such parallel connection of hydraulic motors driving the welding rollers, the rotational speed of the welding rollers is automatically adapted to the welding speed, even in the case of different diameters of the welding rollers. This fact is particularly advantageous in case of welding materials where there is a danger of skidding occurring between the welding roller and the material being welded. The control device is arranged in such a way that the welding circuit is switched on only after the pressing force moving the rollers against the object to be welded has attained the requisite value. At the same time the hydraulic motors are set in motion for rotating the welding rollers. An embodiment of the present invention is illustrated, by way of example, in the single figure of the accompanying drawing.

The welding rollers 1 and 3 are driven by hydraulic motors 29 and 30. Both hydraulic motors are connected to the pressure pipeline in parallel thus constituting a hydraulic differential equalizing the circumferential speeds of the rollers. The pump 19 is designed in the case illustrated so as to be able to supply a continuously or stepwise changeable quantity of pressure liquid. The regulating slide valve 10 is mounted in the pipeline behind the hydraulic motors 29 and 30, that is, at the downstream side of the latter. The control device 10 is designed as a slide valve with a differential piston 13 urged downwards by the action of a spring 14. The stepped portion of the differential piston 13 controls the entrance of the pressure liquid into the chamber 11 having a piston 16 therein which is acted up on by a spring 17. A switch 12 actuated by the piston 16 controls the electromagnet 9 operating the contactor 8 to the primary circuit of a transformer 7.

For controlling the piston 5 inside the cylinder 4 a distributor 26 is mounted in the pipeline between the pump 19 and the hydraulic motors 29 and 30, the piston 28 of said distributor being pushed into its lower position through the action of a spring 27 and raised by the pressure of the operating liquid from the pump 19.

The device described above operates as follows:

Initially the electro-magnets 9 and 22 of both contactors 8 and 21 are deenergized and the electric motor 20 for driving pump 19 is out of action. The piston 28 of the distributor 26 and the piston of 13 the control device 10 are in their lower positions. The space above the piston 5 communicates through the distributor 26 with the container 18 so that the welding rollers 1 and 3 are held apart from each other through the effect of a spring 6. The object to be welded is inserted between the rollers 1 and 3 whereupon the switch 25 is manually closed. The electromagnet 22 of the contactor 21 is supplied with current and the electric motor 20 is energized. The operating liquid from the pump 19 shifts the piston 28 of the distributor 26 into its upper position and enters the cylinder 4 and hydraulic motors 29 and 30. The operating liquid is prevented from returning through the control device 10 to container 18, as long as the stepped portion of the piston 13 of the control device 10 is in its lower position (as shown). The force of the spring 27 of the distributor 26 is in such a ratio in respect of the force of the spring 14 of the control device 10 that the piston 28 is shifted into its upper position at a minimum pressure occurring in the pipeline before the effect of this pressure shifts the differential piston 13 into its upper position thus clearing the way for the pressure liquid to act against the piston 16 in the chamber 11. The force of the spring 14 is adjusted to the requisite value by a set screw 15. This requisite value of the force of the spring 14 is dependent e. g. on the kind of material under treatment. Thus, the welding current passes through only after the welding rollers have been pressed against the object under treatment with the full adjusted pressing force and simultaneously with the rotating movement of the welding rollers. As soon as the welding rollers 1 and 3 bear against the object to be welded, the pressure of the operating liquid begins to rise and at a determined value adjusted by the set screw 15, the piston 13 of the control organ 10 is shifted into its upper position. Thereby the recessed part of the piston 13 opens the passage into the chamber 11, where the pressure liquid urges the piston 16 into its lower position thus opening the return passage into the container 18. The pressure liquid begins to flow through both hydraulic motors 29 and 30, imparting a turning movement to the welding rollers 1 and 3. By the piston 16 being shifted into its lower position the contact 12 is simultaneously closed thus closing the circuit of the electromagnet 9 of the contactor 8, which, upon being closed, completes the circuit to the primary of the welding transformer 7 whereby the welding process is started.

Through the continuous or stepwise change of the quantity of the pressure liquid supplied by the pump 19 the working of the hydraulic motor or motors is changed continuously or stepwise and thereby also the welding speed.

The machine can be equipped either with a single hydraulic motor 29, if only one roller is to be driven, or with two hydraulic motors, as shown whereby a drive of both welding rollers is achieved which has an advantageous influence on the quality of the weld.

The welding operation is finished by returning the switch 25 to its open position. Thus, the electro-magnet 22 is deenergized for opening the contactor 21 and, thereby bringing about instantaneous breaking of the circuit of the electromagnet 9 of contactor 8 whereby the welding current is interrupted.

The device according to the present invention contributes to improving substantially the function of resistance seam-welding machines as well as to a reduction of waste and defective welds and enables a high quality of the welds to be obtained.

I claim:

1. A hydraulic control device for the drive of a resistance seam-welding machine having rotatable rollers movable toward and away from each other to receive an object to be welded therebetween and to which the welding current is supplied; said control device comprising a source of fluid under pressure, a supply pipe extending from said source and having first and second branches, at least one cylinder connected to said first branch and having a piston therein for moving the rollers toward each other in response to the admission of fluid under pressure to said cylinder through said first branch, at least one pressure fluid operated motor connected to said second branch for rotating at least one of the rollers in response to the passage of fluid under pressure through said motor, a first return line extending from said motor back to said source, a pressure regulating device interposed in said first return line and including a housing having large and small diameter portions, a differential piston having large and small diameter portions slidable in said large and small diameter portions, respectively, of said housing, a chamber communicating with said small diameter portion of the housing, said return line opening into said large diameter portion of the housing from said motor and extending to said source from said chamber, adjustable means yieldably urging said differential piston to a position wherein said small diameter portion thereof extends into said small diameter portion of the housing to block the flow of fluid through said return line to said chamber until the fluid under pressure causes said differential piston to move away from said small diameter portion of the housing, a piston in said chamber normally blocking said return line extending from the latter and being moved to uncover the return line in response to the admission of fluid under pressure into said chamber, and a switch for controlling the supplying of welding current to the rollers being actuated by movement of said piston in said chamber.

2. A hydraulic control device as in claim 1; further comprising distributing means interposed in said first branch and having a second return line extending therefrom back to said source, said distributing means having a distributing piston therein which is yieldably urged to a position wherein flow of fluid under pressure through said first branch to said cylinder is blocked and said cylinder communicates with said second return line until the fluid under pressure supplied to said first branch displaces said distributing piston to open said first branch and to interrupt the communication between said cylinder and said second return line.

3. A hydraulic control device as in claim 2; wherein said distributing piston is yieldably urged to its blocking position with a force which is smaller than the force exerted by the fluid under pressure against said distributing piston, and said adjustable means acts yieldably against said differential piston with a force which is smaller than the force applied against said differential piston by the fluid under pressure after passing through said motor so that, during an increase in the pressure in said supply pipe, said distributing piston will be initially displaced to admit fluid under pressure to said cylinder and, thereafter, said differential piston is displaced to open said first return line and thereby permit flow of fluid under pressure through said motor to drive the rollers and to actuate said switch for supplying welding current to the rollers.

References Cited in the file of this patent

UNITED STATES PATENTS

| | | |
|---|---|---|
| 2,127,265 | Martin | Aug. 16, 1938 |
| 2,423,067 | Hansen et al. | June 24, 1947 |
| 2,439,834 | Weightman | Apr. 20, 1948 |
| 2,439,915 | Weightman | Apr. 20, 1948 |

FOREIGN PATENTS

| | | |
|---|---|---|
| 557,021 | Great Britain | Nov. 2, 1943 |